United States Patent

Delest et al.

[11] Patent Number: 5,511,430
[45] Date of Patent: Apr. 30, 1996

[54] METHOD AND DEVICE FOR DETECTING THAT THE DESIGN LOADS OF AN AIRCRAFT HAVE BEEN EXCEEDED

[75] Inventors: Thierry Delest, Pibrac; Olivier Regis; Patrick Schuster, both of Toulous, all of France

[73] Assignee: Aerospatiale Societe Nationale Industrielle, Paris, France

[21] Appl. No.: 350,082

[22] Filed: Nov. 29, 1994

[30] Foreign Application Priority Data

Dec. 6, 1993 [FR] France .................. 93 14584

[51] Int. Cl.$^6$ .................................. G01M 5/00
[52] U.S. Cl. .................................. 73/802
[58] Field of Search .................. 73/802, 178 R, 73/178 T

[56] References Cited

U.S. PATENT DOCUMENTS

| | | | |
|---|---|---|---|
| 3,509,942 | 5/1970 | Lindberg | 73/802 |
| 3,517,550 | 6/1979 | Leventhal | 73/88.5 |
| 3,712,122 | 1/1973 | Harris | 73/88.5 R |
| 4,302,745 | 11/1981 | Johnston et al. | 340/27 |
| 4,453,411 | 6/1984 | Schneider | 73/802 |
| 4,480,480 | 11/1984 | Scott et al. | 73/786 |
| 4,904,999 | 2/1990 | Klansnic et al. | 73/802 |

FOREIGN PATENT DOCUMENTS

| | | |
|---|---|---|
| 3620888 | 1/1988 | Germany . |
| 2014731A | 8/1979 | United Kingdom . |
| WO93/16359 | 8/1993 | WIPO . |

*Primary Examiner*—Richard Chilcot
*Assistant Examiner*—Max H. Norri
*Attorney, Agent, or Firm*—Fisher, Christen & Sabol

[57] ABSTRACT

The invention relates to a method for detecting that the design loads of an aircraft have been exceeded during landing.
According to the invention:
—in a preliminary step:
  the load criteria (C1, C2, ..., Cp) are defined; and
  the laws of variation of the allowable values (C1ad, C2ad, ..., Cpad) of these load criteria (C1, C2, ..., Cp) are determined, as a function of input parameters (P1, P2, ..., Pn); and
—at the moment of landing:
  the values of the said input parameters (P1, P2, ..., Pn) and of the said load criteria (C1, C2, ..., Cp) are measured;
  the allowable values (C1ad, C2ad, ..., Cpad) of the said load criteria (C1, C2, ..., Cp) are calculated;
  for each of the said load criteria (C1, C2, ..., Cp), the measured effective value (C1m, C2m, ..., Cpm) is compared with the calculated allowable value (C1ad, C2ad, ..., Cpad); and
  it is determined whether a structural inspection must be carried out.

10 Claims, 2 Drawing Sheets

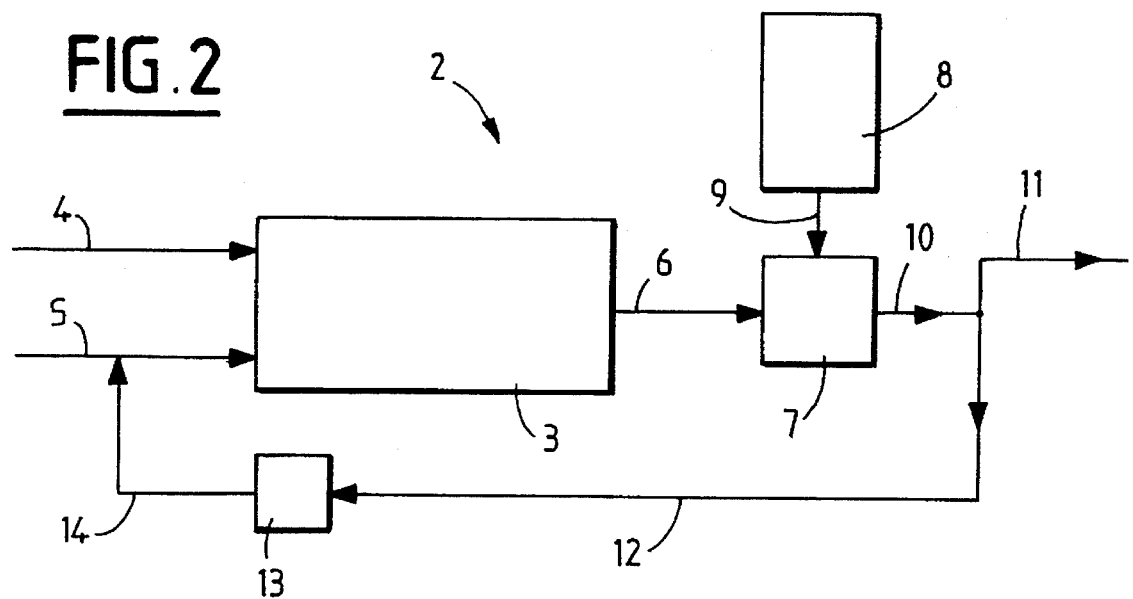
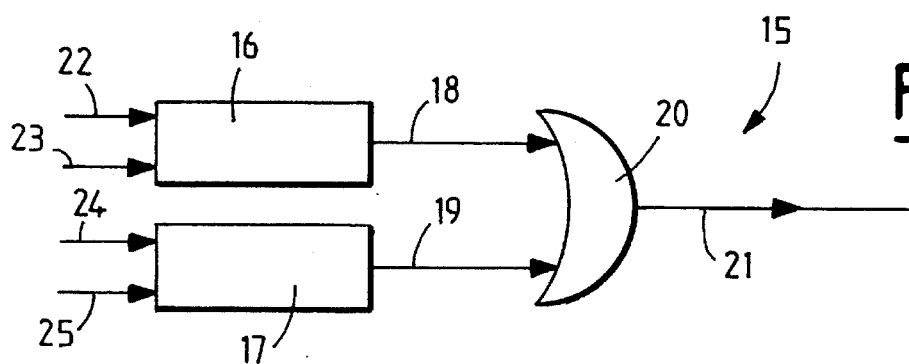
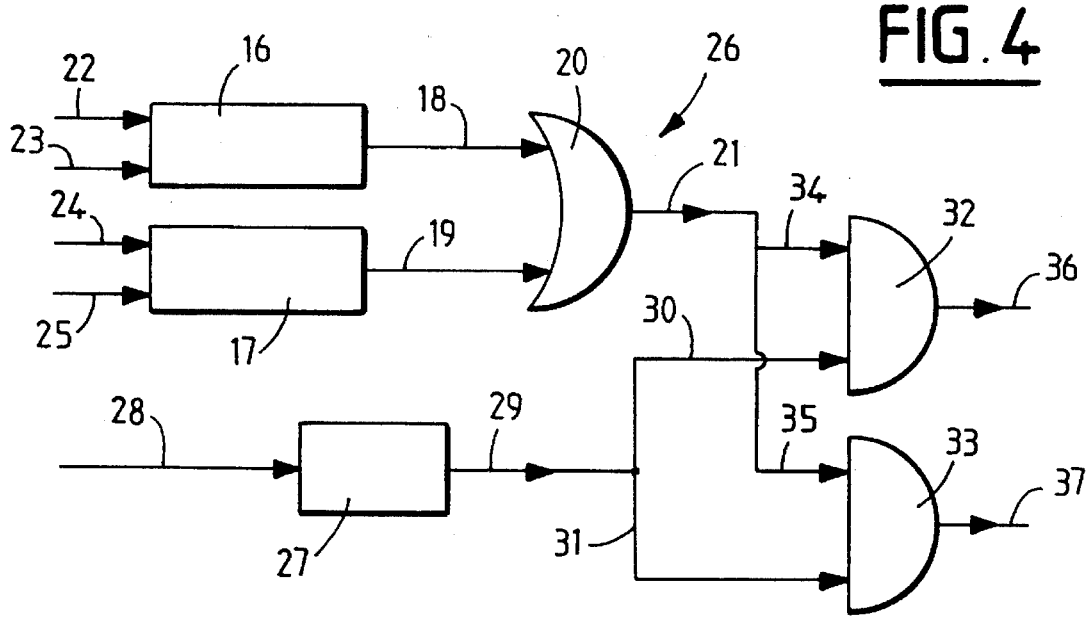

METHOD AND DEVICE FOR DETECTING THAT THE DESIGN LOADS OF AN AIRCRAFT HAVE BEEN EXCEEDED

The present invention relates to a method and a device for detecting that the design loads of an aircraft have been exceeded, particularly for a civil transport aircraft, during landing.

The design loads are understood, in the context of the present invention, to mean the maximum loads which the structure of the aircraft can withstand without permanent deformation appearing.

For obvious safety reasons, inspection of the structure of the aircraft, as well as the repair possible damage, have to be carried out whenever the said design loads are exceeded.

Such an inspection is generally invoked by the pilot, depending on what he felt at the moment of the landing, when he judges that this landing could have caused real damage to the structure of the aircraft. However, this detection of the loads being exceeded, based only on the personal feelings of the pilot, is obviously scarcely reliable.

In effect, the reactions perceived at the level of the flight deck often very badly convey the real load level applied to the aircraft as a whole.

Thus, on the one hand, accelerations felt as being considerable are often very much less than the values which the structure of the aircraft can withstand without damage. That being so, a significant number of inspections, technically not justified, are invoked by the pilot, which entails a waste of time and superfluous expense, heavily penalizing the airline concerned.

On the other hand, considerable loads can be applied to the structure, without, however, giving rise to effects which can be felt at the level of the flight deck. In this case, no inspection is invoked although the structure could have been damaged, which can then entail grave and irremediable consequences during subsequent flights.

It will be noted that small appliances exist which are intended to be fixed at different sites on the structure of the aircraft, for example on the landing gear, and which signal any occurrence of the local acceleration, for which they have been calibrated, being exceeded. However, such appliances are sensitive only to local impulses and do not make it possible to cover the whole of the structure of the aircraft. Moreover, calibration of these appliances is very difficult.

Additionally, devices are known which are intended, for a certain number of parameters, such as the vertical speed or the acceleration of the centre of gravity, to compare the effective value measured during the landing with a predefined allowable value recorded in a computer.

However, the parameters measured are limited in number and only imperfectly indicate the real load level. Moreover, such devices do not make it possible to carry out overall and reliable monitoring of the whole structure of the aircraft, since they do not take account, in particular, of the different dynamic behaviour loads existing. Moreover, the rate of measurement of the parameters in question has to be extremely high in order to make it possible to record all the maxima likely to occur.

Consequently, the previously mentioned known techniques do not make it possible to provide sufficient protection of the structure of the aircraft, or penalize airlines by too great a number of structural inspections which are not technically justified.

Thus, the object of the invention is to detect any occurrence of the design loads of the aircraft being exceeded, not being content with partial and localized items of information which are not correlated with each other, but researching the load level really reached.

To this end, according to the invention, the method for detecting that the design loads of an aircraft have been exceeded during landing, necessitating a structural inspection of the said aircraft being invoked, characterized in that:
—in a preliminary step:
 —load criteria are defined, which are measurable on the aircraft and representative of the effective loads to which the aircraft is subjected; and
 laws of variation of the allowable values of these load criteria are determined as a function of input parameters measurable on the aircraft; and
—at the moment of landing:
 the values of the said input parameters and of the said load criteria are measured;
 on the basis of the said laws of variation and of the said measured values of the input parameters, the allowable values of the said load criteria are calculated;
 for each of the said load criteria the measured effective value is compared with the calculated allowable value; and
 on the basis of the result of the various comparisons, it is determined whether a structural inspection has to be carried out.

Thus, by virtue of the invention, the structure of the aircraft is monitored, based on an objective evaluation of the load level. In fact, this monitoring is based on the comparison of the real values measured at the moment of impact and of the calculated allowable values, of the said load criteria, the said load criteria being representative of the effective loads to which the aircraft is subjected.

Moreover, advantageously, on the basis of the results of the various comparisons, the type of inspection to be carried out is determined.

Thus, by virtue of the invention, it is possible not only to know whether a structural inspection has to be carried out, but it is also possible to specify, depending on the measurements taken on landing and on the corresponding calculations, the parts of the aircraft which have to be checked, which avoids having to inspect the whole of the structure of the aircraft when an inspection is necessary.

Advantageously, according to the type of structural inspection to be carried out, one or more of the following parts of the aircraft are checked: the nose landing gear, the main landing gear, the central landing gear, the wings, the fuselage and the engine pylons.

It is obvious that, according to the use and to the scope envisaged for the invention, parts other than those previously mentioned may be taken into account by the method in accordance with the invention in order to be subjected to a possible inspection.

The type of inspection to be carried out is chosen on the basis of the load criteria having exceeded the corresponding allowable values, as well as on the basis of the value reached by these load criteria during the landing. Thus, the same load criterion which has exceeded the prescribed value may, according to whether it is or is not the only load criterion in this situation and, as appropriate, according to the nature of the other load criteria implicated, may require different types of inspection, which are defined in advance.

According to the invention, in order to determine the law of variation of the allowable values of a load criterion as a function of an input parameter, the corresponding allowable value of the load criterion is sought for various values of the said input parameter, by carrying out the following steps, for each of the said various values of the input parameter:
 a) an assumed value of the load criterion is chosen;

b) the said assumed value of the load criterion and the said value of the input parameter are inserted into a landing model;

c) with the aid of this landing model, the effective loads to which the aircraft is subjected are determined;

d) these effective loads determined are compared with the design limit loads; and e) if the said loads are equal, the said assumed value of the load criterion is defined as allowable value, corresponding to the said value of the input parameter; otherwise, steps a) to e) are repeated, choosing a different assumed value of the load criterion.

Consequently, by knowing the corresponding allowable value of the load criterion, for a certain number of values of the input parameter, it is possible to represent the variation in the allowable value as a function of the input parameter and to seek a mathematical law of variation which reproduces this variation.

For example, the law of variation of the allowable values Ciad of a load criterion Ci, as a function of an input parameter Pi, may be of the form $$Ciad = a3 Pi^3 + a2 Pi^2 + a1 Pi + a0$$

an expression in which a0, a1, a2 and a3 represent constant coefficients.

Moreover, in order to determine the law of variation of the allowable values of a load criterion, as a function of several input parameters, the corresponding allowable value of the load criterion is sought for different combinations of values of the said input parameters, by carrying out the said steps a) to e), for each of the said combinations, for which the chosen values of all the said input parameters are input each time into the landing model.

For a load criterion Cj depending on several input parameters P1, P2, ... Pn, the law of variation of the allowable values Cjad may be, for example, of the form $$Cjad = b1 P1 + b2 P2 + \ldots + bn Pn$$

an expression in which b1, b2, ..., bn represent constant coefficients.

For preference, as input parameters, at least some of the said following parameters are used: the mass of the aircraft, the centre of gravity of the aircraft, the acceleration at the moment of landing, the maximum acceleration recorded in the course of the landing, the attitude of the aircraft, the roll-off speed and the roll speed.

The sampling and the filtering of the parameters used are such that all the peaks of these parameters are taken into account. Thus, it becomes impossible, for example, for a local stress, which is very brief but of high intensity, which risks causing significant damage in the structure of the aircraft, not to be detected and not to be integrated into the calculation.

Advantageously, as load criteria, at least some of the said following criteria are used: the vertical speed, the vertical acceleration, the lateral acceleration and the vertical load on the nose gear.

For implementing the method according to the invention, an on-board device is advantageously provided which includes:

—a first set of sensors intended to measure the values of the said input parameters;

—a second set of sensors intended to measure the values of the said load criteria;

—a computer linked to the said first set of sensors, including the laws of variation of the allowable values of the load criteria, receiving the measured values of the input parameters and determining the corresponding allowable values of the load criteria; and —a comparison device, linked to the said second set of sensors and to the said computer, comparing the measured effective value, for each load criterion, with the calculated allowable value, determining, from the said comparisons, whether a structural inspection has to be carried out and communicating the type of structural inspection to be carried out, as appropriate.

Thus the said comparison device supplies signals at its output which are representative of the result of this determination, the said signals being usable for the purposes of visual display or for being transmitted to other systems, for example to a device for recording on paper or on disc for recording the result with a view to subsequent use, or to a transmitter device for transmitting the result directly to operators on the ground.

The figures of the attached drawing will make it easy to understand how the invention can be produced. In these figures, identical references designate similar elements.

FIG. 2 illustrates a logic device used in deriving the laws of variation of the allowable values of load criteria.

FIG. 3 illustrates a logic device used by a comparison device for results analysis.

FIG. 4 illustrates a logic device improving on the logic device of FIG. 3.

Figure 1:
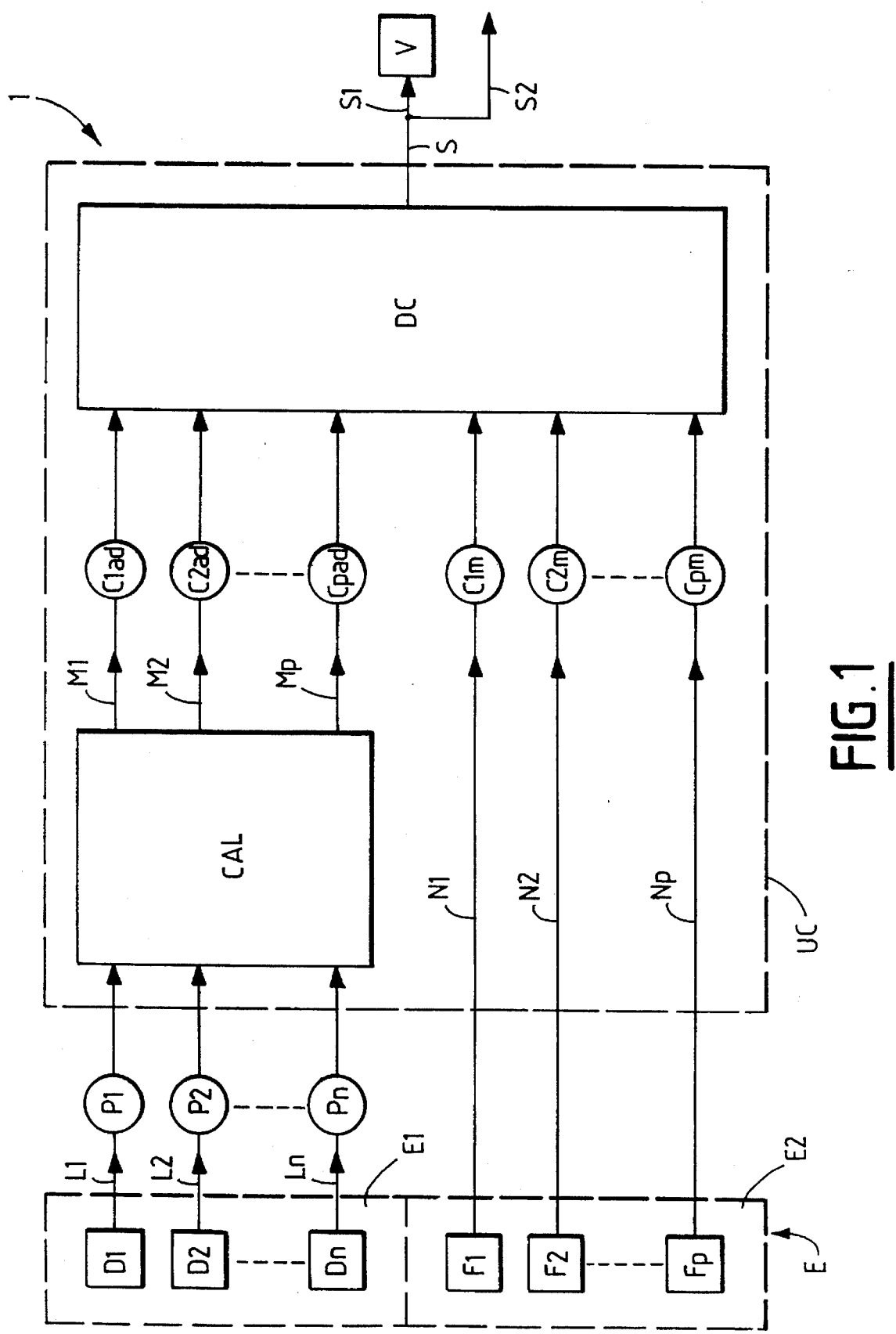
FIG. 1 is the block diagram of a device in accordance with the invention.

The device 1, in accordance with the invention. and represented in FIG. 1, is intended to be installed on board an aircraft in order to detect any occurrence of the design values of the said aircraft being exceeded during landing.

To this end, the said device 1 includes a first set E1 of sensors D1 to Dn. The said sensors D1, D2, ..., Dn are linked, by means of links L1, L2, ..., Ln respectively, to a computer CAL. They measure input parameters P1, P2, ..., Pn at the moment of landing, which they transmit to the said computer CAL.

For the sake of clarification of the drawing, the information transmitted by the various links has been represented by tracing circles on these links and by inscribing the said information in these circles, such as, for example, for the input parameters P1, P2, ..., Pn transmitted by the links L1, L2, ..., Ln.

The said computer CAL, from the said input parameters P1 to Pn and from laws of variation which it has in memory, calculates the allowable values C1ad, C2ad, ..., Cpad of load criteria C1, C2, ..., Cp which are representative of the loads to which the aircraft is subjected. The mode of deriving the said laws of variation will be explained below, with reference to FIG. 2.

This computer CAL may be analog or digital. It may be programmed sequentially or by artificial-intelligence techniques.

The said computer CAL transmits the said allowable values C1ad, C2ad, ..., Cpad to a comparison device DC, by means of links M1, M2, ..., Mp respectively.

The said comparison device DC receives, in addition, the effective values C1m, C2m, ..., Cpm of the said load criteria C1, C2, ..., Cp measured, at the moment of landing, by a second set E2 of sensors F1, F2, ..., Fp and transmitted by links N1, N2, ..., Np.

The said sensors D1 to Dn and F1 to Fp are generally devices already existing on board the aircraft, which avoids having to make particular arrangements for implementing the invention and thus limits the cost of the device 1. In general, these sensors are simple measuring devices directly measuring the effective value of the parameters used in the invention. However, other information sources may be involved, such as, for example, computers present on board the aircraft and intended initially for another use. As the various sensors of the first E1 and the second E2 sets of sensors are of the same type, all the said sensors D1 to Dn and F1 to Fp are grouped together into a single set E.

The said comparison device DC, for each load criterion C1, C2, . . . , Cp, compares the calculated allowable value C1ad, C2ad, . . . , Cpad with the measured value C1m, C2m, . . . , Cpm. Depending on the results of the various comparisons, the said comparison device DC determines whether a structural inspection should be carried out and, as appropriate, the type of inspection to be carried out. Taking account of the results of these various comparisons in determining the type of inspection possibly to be carried out will be explained below, with reference to FIGS. 3 and 4.

At its output S, the said comparison device DC delivers signals representative of the type of inspection possibly having to be carried out, which may be displayed, by means of a link S1, on a display device V and/or can be transmitted, by means of a link S2, to other user systems (not represented), such as, for example, a device for recording on paper or on disc or a transmitter device which makes it possible directly to transmit the result to operators on the ground.

The said comparison device DC and the said computer CAL are grouped together into a central unit UC.

By definition, as previously mentioned, the load criteria C1, C2, . . . , Cp are representative of the effective loads to which the aircraft is subjected, and their allowable values C1ad, C2ad, . . . , Cpad are determined from the said input parameters P1, P2, . . . , Pn.

In accordance with the invention, in order to determine the law of variation of the allowable value Ciad of a load criterion Ci, as a function of input parameter Pi, the corresponding allowable value Ciad of the load criterion Ci is sought, for various values Pi of the said input parameter Pi, from the logic device 2 of FIG. 2. Then, from the various Ciad/Pi pairs thus determined, the corresponding law of variation is deduced.

The said logic device 2 includes a computer 3 with two inputs linked respectively to links 4 and 5, and to one output. The latter is linked, by means of a link 6, to one input of a double-input comparator 7. A memory 8 is connected to the other input of the said comparator 7, by means of a link 9. The said comparator 7 compares the information items, supplied respectively by the said computer 3 and by the said memory 8, with each other, and it delivers one of two responses, depending on the result of this comparison, at its output, via a link 10.

To this end, the link 10 is split into two links 11 and 12, associated respectively with one or the other of the said possible responses.

If the result is positive, that is to say when the two compared values are equal, obviously taking account of a certain predefined margin, the comparator 7 supplies, at its output, by means of the link 11, the values initially input by the links 4 and 5 into the computer 3 and the operation of the logic device is stopped.

In contrast, if the result is negative, that is to say when the difference between the compared values exceeds a predefined margin, the said computer 7 informs a computer 13 by means of the link 12. The said computer 13 then inputs a new value into the computer 3 by means of a link 14 linked to the link 5.

The logic device 2 is thus produced as a loop and it carries out its calculations, continuously, until equality is obtained in the comparator 7.

In order to determine the allowable value Ciad of a load criterion Ci depending only on a single parameter Pi, which is associated with a defined value Pi of the said parameter Pi, the said value Pi is input into the computer 3 by means of the link 4, as well as an assumed value Cith of the said load criterion Ci by means of the link 5.

The said computer 3 includes a theoretical landing model taking account of the characteristics of the aircraft, which makes it possible advantageously to adapt the invention to the type of aircraft used.

The computer 3 from the information inserted and from the said landing model, calculates the load to which the aircraft is subjected in these conditions and transmits the result to the comparator 7 which then compares this calculated value of the load with the limit load which the aircraft can withstand, determined from the design of the aircraft and recorded in the memory 8.

When the two loads are equal, taking account of a predefined margin, the said comparator 7, at its output, over the link 11, transmits the assumed value Cith of the criterion Ci initially input into the computer 3.

This value Cith is then defined as admissible value Ciad associated with the value Pi of the input parameter Pi.

In contrast, when the load calculated on the basis of the landing model does not correspond to the limit load, the comparator 7 informs the computer 13 thereof, which modifies the assumed value Cith of the load criterion, increasing it or decreasing it according to the result of the comparison, and inputs the new value thus determined into the computer 3 by the links 14 and 5, the value Pi of the input parameter Pi input by the link 4 remaining unchanged.

The said logic device 2 repeats the preceding steps, in a loop, until equality is obtained in the comparator 7, that is to say until the allowable value Ciad of the load criterion Ci, which is associated with the value Pi of the input parameter Pi, is obtained.

It will be noted that the same logic device 2 can be used to determine the allowable value of the load criterion for which the effective load does not correspond to the design limit load, but to a certain percentage, for example 80%, of this design limit load. It suffices, for that purpose, to alter the value of the load recorded in the memory 8 consequently.

From the various Ciad/Pi pairs thus obtained, the variation of Ciad as a function Pi is determined, and a theoretical law of variation reproducing this variation is sought.

By way of example, a possible law of variation is of the form $$Ciad = a3Pi^3 + a2Pi^2 + a1Pi + a0$$

an expression in which a0, a1, a2 and a3 represent coefficients characteristic of the performance and of the design values of the aircraft.

When a load criterion Cj is defined on the basis of several input parameters P1 to Pn, the logic device 2 is also used to determine the law of variation of the allowable values Cjad of this load criterion Cj as a function of the said input parameters P1 to Pn.

In such a case, the allowable value Cjad associated with a defined combination of values P1 to Pn of the said input parameters P1 to Pn is determined, via the said logic device 2.

In this case, by way of example, a defined law of variation is of the form $$Cjad = a1P1 + a2P2 + \ldots + anPn$$

a1, a2, ..., an representing characteristic coefficients.

As previously described, the comparison device DC (see FIG. 1), for each of the said load criteria C1, C2, ..., Cp compares the allowable value C1ad, C2ad, ..., Cpad calculated by the computer CAL with the aid of laws of variation, such as those previously described, with the effective value C1m, C2m, ..., Cpm measured at the moment of the landing by the second set E2 of sensors and, on the basis of analysis of these various comparisons, deduces therefrom whether a structural inspection should be carried out. For this purpose, it uses a logic device 15 represented in FIG. 3.

The said logic device 15 includes two comparators 16 and 17, each with a dual input and one output. The respective outputs of the said comparators 16 and 17 are connected, by means of links 18 and 19, to the two inputs of an OR logic gate 20, the output of this OR logic gate 20 being connected to a link 21.

When the output of the said OR logic gate 20 is activated, that is to say when the link 21 is transmitting a signal, a structural inspection is to be carried out.

According to the information input into the comparator 16 by links 22 and 23 connected at its inputs, as well as according to that input into the comparator 17 by links 24 and 25 connected to the inputs of the latter, it is even possible, moreover, to determine the type of structural inspection to be carried out, that is to say that it is possible to specify the parts of the aircraft to be inspected.

By way of example, on the one hand the allowable value Nzad of the vertical acceleration Nz calculated from input parameters and, on the other hand, the effective value Nzm measured at the moment of the landing can be input into the comparator 16, and the allowable and measured values of the lateral acceleration Ny respectively can be input into the comparator 17.

The said comparators 16 and 17 are programmed to deliver a signal at their output, every time the measured input value is greater than the allowable input value.

Hence, when the OR logic gate 20 delivers a signal at its output, ordering a structural inspection to be invoked, as soon as one of its inputs is activated, a structural inspection is to be carried out, in this example, if one of the lateral or vertical accelerations exceeds its allowable value.

From another logic device 26 represented in FIG. 4, incorporating and improving on the logic device 15 of FIG. 3, it is possible yet further to specify the parts of the aircraft having to be inspected.

The said logic device 26 includes, in addition to the logic device 15, a comparator 27 equipped with an input link 28 and with an output link 29 which is divided in two links 30 and 31, only one of which is activated each time depending on the response of the comparator 27. If the response is positive, the link 30 is activated, the latter link being connected to an AND logic gate 32. On the contrary, if the response is negative, the link 31 is activated, this latter link being connected to an AND logic gate 33.

The other two inputs of the said AND logic gates 32 and 33 are connected respectively to two links 34 and 35 obtained by the splitting of the link 21 of the logic device 15.

The outputs of the AND logic gates 32 and 33 are connected respectively to links 36 and 37. They are, moreover, each associated with a different type of structural inspection to be carried out. Thus, according to whether one or other of the links 36, 37 is transmitting a signal, one or other of the said corresponding inspection types has to be taken into account.

According to a particular example proved in practice, in the case in which the input into the logic device 26 is:

—via the link 22, the measured value Vzm of the vertical speed Vz of the aircraft, and, via the link 23, the allowable value Vzad1 of the vertical speed Vz, calculated from a first law of variation, when the vertical acceleration Nz is greater than 1 g, q representing the acceleration due to gravity, —via the link 24, the value Vzm, and via the link 25, the allowable value Vzad2 of the vertical speed Vz, calculated from a second law of variation, when the vertical acceleration Nz is less than 1 g, and —the pitch Θ via the link 28, the comparator 27 comparing the value of Θ (expressed in °) with a recorded value equal to 4°, the following must be inspected on the aircraft:

—the central and main landing gears and the engine pylons, if the link 36 is activated; or —the main landing gear, the wings and the engine pylons, if the link 37 is activated.

We claim:

1. Method for detecting that design loads of an aircraft have been exceeded during moment of landing, necessitating a structural inspection of the said aircraft being invoked, comprising:

in a step preliminary to the moment of landing:
defining load criteria (C1, C2, ..., Cp), which are measurable on the aircraft and representative of effective loads to which the aircraft is subjected; and
determining laws of variation of allowable values (C1ad, C2ad, ..., Cpad) of these load criteria, (C1, C2, ..., Cp) as a function of input parameters (P1, P2, ..., Pn) measurable on the aircraft; and at the moment of landing:
measuring values of the said input parameters (P1, P2, ..., Pn) and of the said load criteria (C1, C2, ..., Cp);
calculating, on the basis of the said laws of variation and of the said measured values of the input parameters, allowable values (C1ad, C2ad, ..., Cpad) of the said load criteria (C1, C2, ..., Cp);
comprising for each of the said load criteria (C1, C2, ..., Cp), measured effective value (C1m, C2m, ..., Cpm) with calculated allowable value (C1ad, C2ad, ..., Cpad); and determining, on the basis of the result of the various comparisons, whether a structural inspection has to be carried out.

2. Method according to claim 1, characterized in that, on the basis of the result of the various comparisons, the type of structural inspection to be carried out is determined as appropriate.

3. Method according to claim 2, characterized in that, according to the type of structural inspection to be carried out, one or more of the following parts of the aircraft are checked: the nose landing gear, the main landing gear, the central landing gear, the wings, the fuselage and the engine pylons.

4. Method according to claim 1, characterized in that, in order to determine the law of variation of the allowable values (Ciad) of a load criterion (Ci) as a function of an input parameter (Pi), the corresponding allowable value (Ciad) of the load criterion is sought for various values of the said input parameter (Pi), by carrying out the following steps, for each of the said various values of the input parameter:

a) an assumed value of the load criterion is chosen;

b) the said assumed value of the load criterion and the said value of the input parameter are inserted into a landing model;

c) with the aid of this landing model, the effective loads to which the aircraft is subjected are determined;

d) these effective loads determined are compared with the design limit loads; and e) if the said loads are equal, the said assumed value of the load criterion is defined as allowable value, corresponding to the said value of the input parameter; otherwise, steps a) to e) are repeated, choosing a different assumed value of the load criterion.

5. Method according to claim 4, characterized in that the law of variation of the allowable values (Ciad) of a load criterion (Ci), as a function of an input parameter (Pi), is of the form $$Ciad = a3Pi^3 + a2Pi^2 + a1Pi + a0$$

an expression in which a0, a1, a2 and a3 represent constant coefficients.

6. Method according to claim 4, characterized in that, in order to determine the law of variation of the allowable values (Cjad) of a load criterion (Cj), as a function of several input parameters (P1, P2, . . . , Pn), the corresponding allowable value (Cjad) of the load criterion (Cj) is sought for different combinations of values of the said input parameters (P1, P2, . . . , Pn), by carrying out the said steps a) to e), for each of the said combinations, for which the chosen values of all the said input parameters (P1, P2, . . . , Pm) are input each time into the landing model.

7. Method according to claim 6, characterized in that the law of variation of the allowable values (Cjad) of a load criterion (Cj), as a function of input parameters (P1, P2, . . . , Pn), is of the form $$Cjad = 1 P1 + b2P2 + \ldots + bnPn$$

an expression in which b1, b2, . . . , bn represent constant coefficients.

8. Method according to claim 1, characterized in that, as input parameters (P1, P2, . . . , Pn), at least some of the said following parameters are used: the mass of the aircraft, the centre of gravity of the aircraft, the acceleration at the moment of landing, the maximum acceleration recorded in the course of the landing, the attitude of the aircraft, the roll-off speed and the roll speed.

9. Method according to claim 1, characterized in that, as load criteria (C1, C2, . . . , Cp), at least some of the said following criteria are used: the vertical speed, the vertical acceleration, the lateral acceleration and the vertical load on the nose gear.

10. Device (1) for implementing the method specified under one of claims 1 to 9, characterized in that it includes:

—a first set (E1) of sensors (D1, D2, . . . , Dn) intended to measure the values of the said input parameters (P1, P2, . . . , Pn);

—a second set (E2) of sensors (F1, F2, . . . , Fp) intended to measure the values (C1m, C2m, . . . , Cpm) of the said load criteria (C1, C2, . . . , Cp);

—a computer (CAL) linked to the said first set (E1) of sensors, including the laws of variation of the allowable values of the load criteria, receiving the measured values of the input parameters (P1, P2, . . . , Pn) and determining the corresponding allowable values (C1ad, C2ad, . . . , Cpad) of the load criteria (C1, C2, . . . , Cp); and —a comparison device (DC), linked to the said second set (E2) of sensors and to the said computer (CAL), comparing the measured effective value (C1m, C2m, . . . , Cpm), for each load criterion (C1, C2, . . . , Cp), with the calculated allowable value (C1ad, C2ad, . . . , Cpad), determining, from the said comparisons, whether a structural inspection has to be carried out and communicating the type of structural inspection to be carried out, as appropriate.

* * * * *